United States Patent
Hunt et al.

(10) Patent No.: US 12,514,159 B2
(45) Date of Patent: *Jan. 6, 2026

(54) HEADER HEIGHT CONTROL FOR A HARVESTING HEAD

(71) Applicant: CNH Industrial America LLC, New Holland, PA (US)

(72) Inventors: Cory Douglas Hunt, Millersville, PA (US); Jethro Martin, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 880 days.

This patent is subject to a terminal disclaimer.

(21) Appl. No.: 17/824,008

(22) Filed: May 25, 2022

(65) Prior Publication Data
US 2022/0279719 A1  Sep. 8, 2022

Related U.S. Application Data

(63) Continuation of application No. 16/439,165, filed on Jun. 12, 2019, now Pat. No. 11,382,268.

(51) Int. Cl.
*A01D 41/16* (2006.01)
*A01D 34/00* (2006.01)
(Continued)

(52) U.S. Cl.
CPC ......... *A01D 41/141* (2013.01); *A01D 34/008* (2013.01); *A01D 41/127* (2013.01);
(Continued)

(58) Field of Classification Search
CPC .... A01D 34/008; A01D 34/28; A01D 34/283; A01D 34/286; A01D 34/54;
(Continued)

(56) References Cited

U.S. PATENT DOCUMENTS 7,540,130 B2 * 6/2009 Coers ................... A01D 41/141
56/228
9,609,806 B2 4/2017 Schlipf et al.
(Continued)

FOREIGN PATENT DOCUMENTS

CN 106233921 A 12/2016
DE 102017113776 A1 * 12/2018 ........... A01D 34/008
(Continued)

OTHER PUBLICATIONS

International Search Report and Written Opinion for International Application No. PCT/US2020/037454, dated Nov. 10, 2020, 12 pages.
(Continued)

*Primary Examiner* — Adam J Behrens
(74) *Attorney, Agent, or Firm* — Buchanan Ingersoll & Rooney PC

(57) ABSTRACT

An agricultural vehicle header system having a center section, an inboard height sensor located on the center section between a lateral centerline and an end of the center section, a wing section movably attached to the end of the center section, a number of outboard height sensors located on the wing section between an inboard end and an outboard end of the wing section, and a header control subsystem. Each of the outboard height sensors is configured to output a respective outboard height sensor signal. The header control subsystem is operatively connected to the outboard height sensors, and configured to receive the respective outboard height sensor signals from each of the outboard height sensors, and generate a single emulated outboard height sensor signal based on the outboard height sensor signals.

28 Claims, 4 Drawing Sheets

(51) Int. Cl.
   *A01D 41/127* (2006.01)
   *A01D 41/14* (2006.01)
   *A01D 41/06* (2006.01)
(52) U.S. Cl.
   CPC ....... *A01D 41/1271* (2013.01); *A01D 41/144* (2013.01); *A01D 41/16* (2013.01); *A01D 41/06* (2013.01)
(58) Field of Classification Search
   CPC .... A01D 41/127; A01D 41/144; A01D 41/06; A01D 41/141; A01D 41/16; A01D 41/145; A01D 75/287
   See application file for complete search history.

(56) References Cited

U.S. PATENT DOCUMENTS

| | | | |
|---|---|---|---|
| 9,668,412 | B2 | 6/2017 | Ritter et al. |
| 9,693,502 | B2 | 7/2017 | Gofron et al. |
| 9,992,924 | B2 | 6/2018 | van Vooren et al. |
| 10,070,575 | B2 | 9/2018 | Wenger et al. |
| 10,165,726 | B2 | 1/2019 | Lauwers et al. |
| 10,216,156 | B2 | 2/2019 | Enns et al. |
| 10,952,375 | B2 * | 3/2021 | Shearer ................. A01D 41/144 |
| 2007/0204582 | A1 * | 9/2007 | Coers .................... A01D 41/141 56/10.2 E |
| 2011/0099962 | A1 * | 5/2011 | Coers .................... A01D 41/141 56/10.4 |
| 2013/0345937 | A1 * | 12/2013 | Strelioff ............... A01D 41/141 701/50 |
| 2018/0279549 | A1 * | 10/2018 | Lacy .................... A01D 41/145 |
| 2018/0303029 | A1 | 10/2018 | Wilbert et al. |
| 2018/0332768 | A1 * | 11/2018 | Isaac ...................... A01D 41/06 |
| 2018/0368317 | A1 * | 12/2018 | Schulze Selting ... A01D 41/141 |
| 2019/0000014 | A1 | 1/2019 | Farley et al. |
| 2019/0059223 | A1 * | 2/2019 | Seiders, Jr. .......... A01B 63/008 |
| 2020/0029484 | A1 * | 1/2020 | Weidenbach .......... A01B 63/24 |
| 2021/0127657 | A1 | 5/2021 | Kiefer et al. |

FOREIGN PATENT DOCUMENTS

| | | |
|---|---|---|
| WO | 2008098290 A1 | 8/2008 |
| WO | 2018162539 A1 | 9/2018 |
| WO | 2020102209 A1 | 5/2020 |

OTHER PUBLICATIONS

Entire patent prosecution history of U.S. Appl. No. 16/439,165, filed Jun. 12, 2019, entitled, "Header Height Control for a Harvesting Head."

* cited by examiner

HEADER HEIGHT CONTROL FOR A HARVESTING HEAD

CROSS-REFERENCE TO RELATED APPLICATION

This application is a continuation of U.S. patent application Ser. No. 16/439,165, filed Jun. 12, 2019, the contents of such application being incorporated herein by reference.

BACKGROUND OF THE INVENTION

Agricultural combines are machines that gather crop materials and separate the desirable crop (grain, seeds, etc.) from the discardable material (straw, tailings, etc.). To do so, the combine typically collects all of the crop materials using a system including a header and a feeder. The header gathers a wide swath of material from the ground, and moves the material towards the feeder. The feeder conveys the consolidated crop materials to a threshing and separating system, which separates the desirable crop from the remaining material.

The width of the combine header determines how much crop is collected during each pass of the combine through a field. In some cases, it is desirable to increase the width of the header to improve harvesting efficiency in terms of reducing the number of passes required to completely harvest a given area. However, wider headers can be less effective at following the ground contours than a narrow header, and this can lead to less efficient harvesting of low-growing crops or crops planted on particularly uneven terrain.

To address the problem of undulating terrain, headers have been made with articulated heads. For example, U.S. Pat. Pub. No. 2019/0000014 discloses a combine draper head having a center section and a pivotable "wing" located on each side of the center section. As another example, U.S. Pat. No. 9,992,924 discloses a combine having an articulated header that can be moved to different positions to improve harvesting and also provide a more compact profile during transport. U.S. Pat. Nos. 10,070,575 and 10,165,726 also show combines having headers with pivoting elements.

A further problem with articulated headers is that in some cases they do not operate in a suitable manner with existing combine control systems that are configured to control the height or orientation of a unitary header. An example of such an existing combine system is shown in FIG. 1. Here, the combine 100 comprises a chassis 102, a header 104, and wheels 106 or the like to drive the combine 100 across the ground G. The header 104 comprises a unitary structure that does not have articulated joints (e.g., pivots or the like) along its length.

The header 104 is connected to the chassis 102 by a mount 108, such as a feeder housing that conveys crop material from the header 104 to the inner workings of the combine 100 within the chassis 102. The mount 108 is movable to reposition the header 104 relative to the chassis 102 under the control of a control system. For example, the mount 108 may be connected to the chassis 102 by a horizontal lateral pivot 110 and hydraulic actuators 112, such that operation of the actuators 112 pivots the mount 108 about the lateral pivot 110 to raise and lower the header 104. The mount 108 also may be connected for tilting movement relative to the chassis 102 by, for example, providing a longitudinal pivot 114 between the mount 108 and the header 104, and an actuator 116 to control the tilt position of the header 104. The example of FIG. 1 has three actuators 110, 112, but fewer actuators may be used. For example, a pair of actuators 112 may be used to provide a combination of vertical movement (moving the header 104 towards and away from the ground G), and tilting movement (moving one lateral side of the header more or less than the other side in the vertical direction to rotate about a longitudinal axis).

The position of the header 104 relative to the chassis 102 is controlled by a combine control system 118, which typically is integrated into a cabin or other location within the combine chassis 102. The control system 118 receives ground height measurements from height sensors located along the header 104. For example, the header 104 may have an outboard left height sensor $120_L$, an inboard left height sensor $120_{LC}$, an outboard right height sensor $120_R$, and an inboard right height sensor $120_{RC}$. Each height sensor 120 provides a signal representative of a measurement of the height of the header 104 above the ground G at the location of the respective sensor 120. The control system 118 processes these signals to decide how to operate the actuators 112, 116 to position the header 104. For example, the control system might average the height values obtained from the inboard and outboard left height sensors $120_{LC}$ and $120_L$ to obtain a height setting for the left side of the header 104, and similarly average the height values obtained from the inboard and outboard right height sensors $120_{RC}$ and $120_R$ to obtain a height setting for the right side of the header 104, then operate the actuators 112, 116 to move the header 104 until the height sensors 120 provide signals indicating that they have obtained or sufficiently approached the desired height settings.

The correct operation of the foregoing control system is premised on the header 104 being a unitary header that does not have any articulated connections between header segments. Thus, if a segmented header having movable wings were installed in place of the unitary header 104, the output of the height sensors 120 would not be sufficient to properly control the position of the segmented header. An attempt to address the problem of controlling a segmented header using a combine control system that is intended to control a unitary header is disclosed in U.S. Pat. Pub. No. 2018/0368317. This publication describes a segmented header having angle sensing detectors that measure the angles of the wing sections relative to the center section, and height sensors to detect height above the ground at various locations along the header. When the wing sections reach a predetermined angle relative to the center section, a controller enters a "correction mode" in which an adjustment signal is sent to the header controller.

All of the foregoing references and all other references noted in this disclosure are incorporated by reference into this disclosure.

This description of the background is provided to assist with an understanding of the following explanations of exemplary embodiments, and is not an admission that any or all of this background information is necessarily prior art.

SUMMARY OF THE INVENTION

In one exemplary embodiment, there is provided a header system for an agricultural vehicle. The header system includes a center section extending in a lateral direction from a first end to a second end with a lateral centerline of the center section between the first end and the second end, and a first wing section movably attached to the first end of the center section and extending in the lateral direction from a first inboard end to a first outboard end, the first wing section being movable relative to the center section through a first range of motion. A first inboard height sensor is located on the center section between the lateral centerline and the first end of the center section and configured to output a first inboard height sensor signal. A plurality of first outboard height sensors are located on the first wing section between the first inboard end and the first outboard end, each of the plurality of first outboard height sensors being configured to output a respective first outboard height sensor signal. A header control subsystem is operatively connected to the plurality of first outboard height sensors, and configured to receive the respective first outboard height sensor signal from each of the plurality of first outboard height sensors, and generate a single emulated first outboard height sensor signal based on the first outboard height sensor signals.

In another exemplary aspect, there is provided an agricultural combine having a chassis, a header, a movable mount connecting the header to the chassis, a header control subsystem, and a header position control system. The header has a center section extending in a lateral direction from a first end to a second end with a lateral centerline of the center section between the first end and the second end, a first inboard height sensor located on the center section between the lateral centerline and the first end of the center section and configured to output a first inboard height sensor signal, a second inboard height sensor located on the center section between the lateral centerline and the second end of the center section and configured to output a second inboard height sensor signal, a first wing section movably attached to the first end of the center section and extending in the lateral direction from a first inboard end to a first outboard end, the first wing section being movable relative to the center section through a first range of motion, a plurality of first outboard height sensors located on the first wing section between the first inboard end and the first outboard end, each of the plurality of first outboard height sensors being configured to output a respective first outboard height sensor signal, a second wing section movably attached to the second end of the center section and extending in the lateral direction from a second inboard end to a second outboard end, the second wing section being movable relative to the center section through a second range of motion, and a plurality of second outboard height sensors located on the second wing section between the second inboard end and the second outboard end, each of the plurality of second outboard height sensors being configured to output a respective second outboard height sensor signal. The header control subsystem is operatively connected to the plurality of first outboard height sensors and the plurality of second outboard height sensors, and configured to: receive the respective first outboard height sensor signal from each of the plurality of first outboard height sensors and generate a single emulated first outboard height sensor signal based on the first outboard height sensor signals, and receive the respective second outboard height sensor signal from each of the plurality of second outboard height sensors and generate a single emulated second outboard height sensor signal based on the second outboard height sensor signals. The header position control system is operatively connected to the first inboard height sensor, the second inboard height sensor, the header control subsystem, and the movable mount, the header position control system being configured to operate the movable mount to change an orientation of the header relative to the chassis based on the first inboard height sensor signal, the second inboard height sensor signal, the single emulated first outboard height sensor signal, and the single emulated second outboard height sensor signal.

In some embodiments, a header position control system may be operatively connected to the first inboard height sensor to receive the first inboard height sensor signal, and operatively connected to the header control subsystem to receive the single emulated first outboard height sensor signal. The header position control system is configured to operate one or more actuators to move the header in response to the first inboard height sensor signal and the single emulated first outboard height sensor signal. The header control subsystem may be is integral with the header position control system.

In some embodiments, the first inboard height sensor and the plurality of first outboard height sensors each comprise one or more radar rangefinders, optical rangefinders, ultrasonic rangefinders, or mechanical rangefinders.

In some embodiments, the first wing section is movably attached to the center section by one or more pivots.

In some embodiments, the plurality of first outboard height sensors comprise at least three first outboard height sensors laterally spaced between the first inboard end and the first outboard end. The header control subsystem may be configured to generate the single emulated first outboard height sensor signal by calculating a linear regression of the first outboard height sensor signals, calculating a y-intercept value of the linear regression, and setting the y-intercept value as the single emulated first outboard height sensor signal.

In some embodiments, the header system also includes a second inboard height sensor located on the center section between the lateral centerline and the second end of the center section and configured to output a second inboard height sensor signal; a second wing section movably attached to the second end of the center section and extending in the lateral direction from a second inboard end to a second outboard end, the second wing section being movable relative to the center section through a second range of motion; and a plurality of second outboard height sensors located on the second wing section between the second inboard end and the second outboard end, each of the plurality of second outboard height sensors being configured to output a respective second outboard height sensor signal. The header control subsystem is operatively connected to the plurality of second outboard height sensors, and configured to receive the respective second outboard height sensor signal from each of the plurality of second outboard height sensors, and generate a single emulated second outboard height sensor signal based on the second outboard height sensor signals. The plurality of second outboard height sensors may include at least three second outboard height sensors laterally spaced between the second inboard end and the second outboard end. The header control subsystem may be configured to generate the single emulated second outboard height sensor signal by calculating a linear regression of the second outboard height sensor signals, calculating a y-intercept value of the linear regression, and setting the y-intercept value as the single emulated second outboard height sensor signal. The header position control system may be configured to operate based on only four header height input variables, and may be configured to receive the first inboard height sensor signal, the second inboard height sensor signal, the single emulated first outboard height sensor signal, and the single emulated second outboard height sensor signal as the only four header height input variables.

In another exemplary embodiment, there is provided a method for operating an articulated header comprising a center section operatively connected to a chassis by a movable mount, and two wing sections movably connected to the center section. The method includes: receiving a first inboard height sensor signal from a first inboard height sensor located on the center section proximate to a first end of the center section; receiving a second inboard height sensor signal from a second inboard height sensor located on the center section proximate to a second end of the center section; receiving a plurality of first outboard height sensor signals from respective first outboard height sensors on a first wing section movably attached to the first end of the center section; generating a single emulated first outboard height sensor signal based on the plurality of first outboard height sensor signals; receiving a plurality of second outboard height sensor signals from respective second outboard height sensors on a second wing section movably attached to the second end of the center section; generating a single emulated second outboard height sensor signal based on the plurality of second outboard height sensor signals; providing the first inboard height sensor signal, the second inboard height sensor signal, the single emulated first outboard height sensor signal and the single emulated second outboard height sensor signal as four individual inputs to a header position control system; and operating the header position control system to move the center section relative to the chassis based on the four individual inputs.

The method may also include: generating the single emulated first outboard height sensor signal comprises calculating a first linear regression of the first outboard height sensor signals, calculating a first y-intercept value of the first linear regression, and setting the first y-intercept value as the single emulated first outboard height sensor signal; and generating the single emulated second outboard height sensor signal comprises calculating a second linear regression of the second outboard height sensor signals, calculating a second y-intercept value of the second linear regression, and setting the second y-intercept value as the single emulated second outboard height sensor signal.

BRIEF DESCRIPTION OF THE DRAWINGS

Embodiments of inventions will now be described, strictly by way of example, with reference to the accompanying drawings, in which.

DETAILED DESCRIPTION OF THE DRAWINGS

Figure 1:
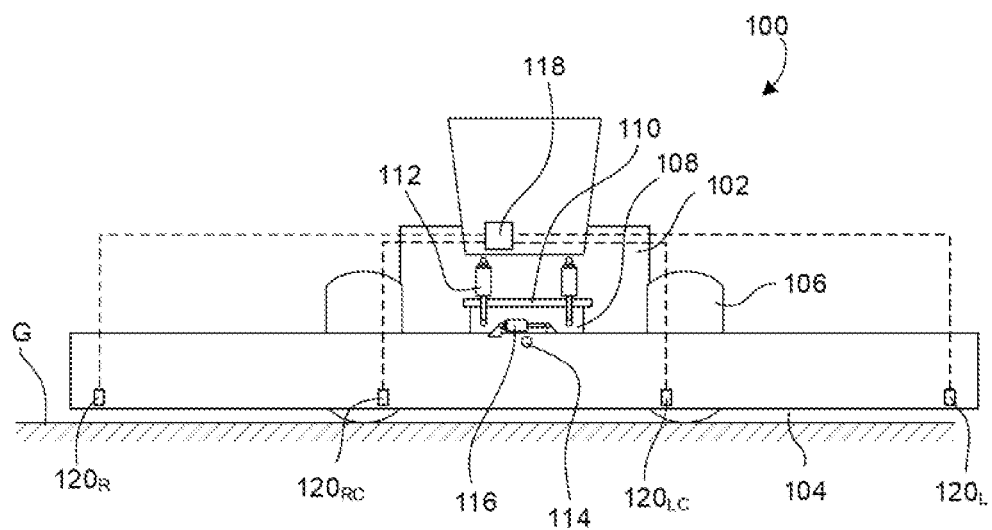
FIG. 1 is a schematic front view of a prior art agricultural vehicle having a unitary header.

The drawing figures depict one or more implementations in accordance with the present concepts, by way of example only, not by way of limitations. In the figures, like reference numerals refer to the same or similar elements.

Figure 2:
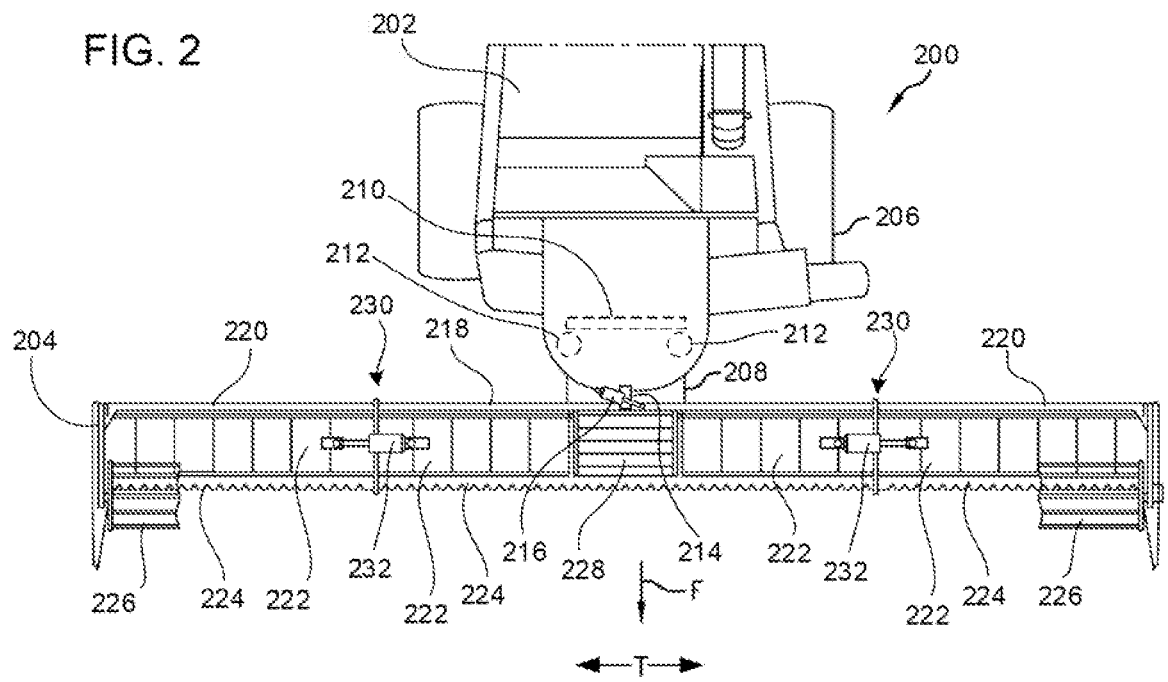
FIG. 2 is a top view of an agricultural vehicle having an articulated header.
Figure 3:
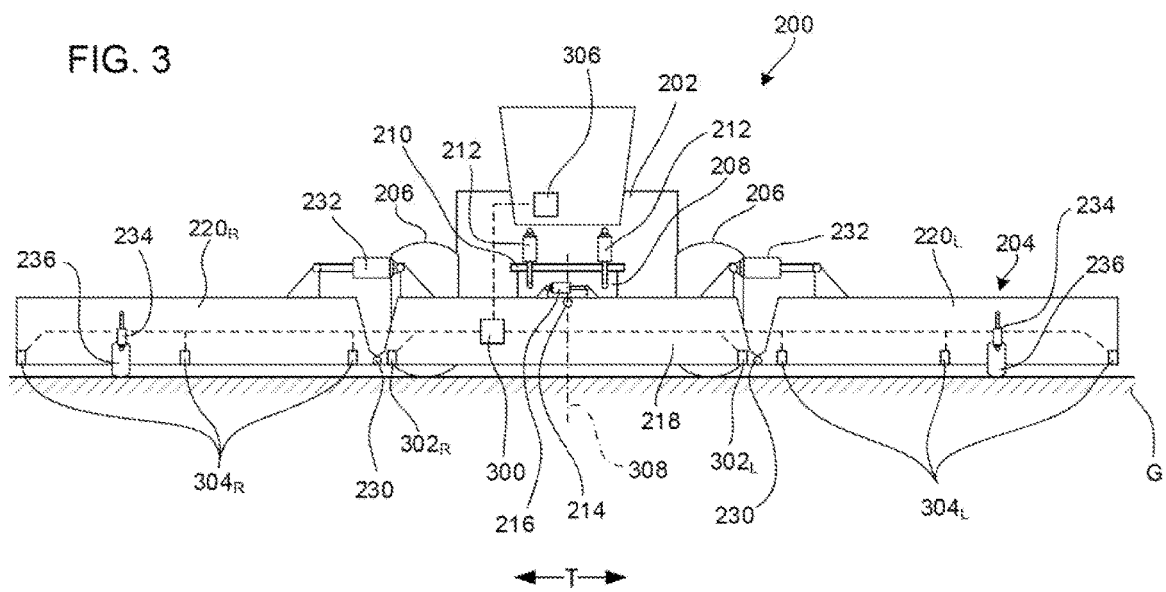
FIG. 3 is front view of the agricultural vehicle of FIG. 2.

Referring to FIGS. 2 and 3, there is shown an exemplary embodiment of an agricultural vehicle 200 in the form of a combine harvester which generally includes a chassis 202 and a header 204 carried by the chassis 202. The chassis 202 is supported on driving wheels 206 or tracks, as known in the art, and configured to move in a forward direction, illustrated as arrow F, during harvesting operations. For simplicity, only the front portion of the vehicle 200 is shown in the top view of FIG. 2.

The header 204 is connected to the chassis 202 by a mount 208. The mount 208 may comprise a feeder house or grain conveyor configured to collect crop material and direct it to the inner workings of the vehicle 200. Such inner workings typically will also include additional systems for the separation and handling of collected crop material, such as threshers, separators, grain elevators, a grain tank, a straw chopper and spreader, and so on. Such additional systems are known in the art and omitted from view for brevity of description. It should also be appreciated that the header 204 described and illustrated herein does not necessarily need to be included on a combine harvester, but can be incorporated in other agricultural vehicles such as mowers.

The mount 208 is an articulated connection comprising one or more linkage arms, controllers (e.g., hydraulic pistons), or the like to control the position of the header 204 relative to the chassis 202, such as known in the art. For example, the mount 208 may comprise a feeder housing or other rigid structure that is attached to the chassis by a lateral pivot 210 (i.e., a pivot having a rotation axis extending laterally in the horizontal plane relative to the forward direction F) that permits the mount 208 to pivot up and down relative to the chassis 202. One or more actuators 212 are provided between the chassis 202 and the feeder housing to control the vertical position of the end of the mount 208, and thereby control the vertical position of the header 204 attached to the end of the mount 208. The mount 208 also may allow rotational movement between the header 204 and the chassis 202. For example, the mount 208 may include a longitudinal pivot 214 at a distal end of the feeder housing. The longitudinal pivot 214 has a pivot axis that is generally aligned with the forward direction F, but this pivot axis may be tilted through a range of angles as the feeder housing is pivoted up and down. One or more actuators 216 may be provided to rotate the header 204 about the longitudinal pivot 214. The lateral pivot 210 and longitudinal pivot are shown as separate pivots, but they may be combined into a single joint, such as a gimbal mount (a.k.a., a "Cardon" joint or universal joint), a ball and socket connection, a pintle connection, or the like.

Other embodiments may use any suitable arrangement of parts and controllers to control motion of the header 204 relative to the chassis 202. For example, the two actuators 212 may be attached to extend between the chassis 202 and the header 204 (rather than connecting to the intervening structure of the mount 208), and operated together to control both elevation and tilt of the header 204. Other alternatives and variations will be apparent to persons of ordinary skill in the art in view of the present disclosure, and the invention is not intended to be limited to any particular mechanisms for providing the relative motion or motion control between the header 204 and chassis 202.

The header 204 is an articulated (or "segmented") header having a center section 218 and two wing sections 220. The center section 218 extends in a lateral direction T from a first lateral end to a second lateral end. Each wing section 220 is movably attached at a respective lateral end of the center section 218, and each wing section 220 extends in the transverse direction T from a respective inboard end located proximate to the center section 218 to a respective outboard end located distally from the center section 218. Each wing section is movable, relative to the center section 218, through a respective range of motion.

The center section 218 and wing sections 220 may include any suitable operating mechanisms, such as mowers, seeders, tilling mechanism, and so on. For example, in the shown embodiment, the center section 218 and wing sections 220 comprise a so-called draper head, in which each section 218, 220 includes a respective conveyor system 222, cutter system 224 and reel system 226 (the reels 226 are partially omitted to show underlying parts more clearly). The conveyor systems 222 on the wing sections 220 are configured to move crop material towards the center section 218 (and the mount 208). The center section 218 has two conveyor systems 222 that move crop material received from the wing sections 220 towards the mount 208. At the middle of the center section 218, there is a feeder conveyor 228 that collects the crop material from the conveyor systems 222 and directs it into the vehicle 200 for further processing. The conveyor systems 222 may comprise conveyor belts, augers, or the like. The cutter systems 224 are provided to cut crop material from the ground, and the reel systems 226 help hold, lift and move the crop material towards the conveyor systems 222. The general details and features of the conveyor systems 222, cutter systems 224, and reel systems 226 will be understood by persons of ordinary skill in the art, and need not be described herein in detail.

The wing sections 220 are movably connected to the center section 218 by respective articulated joints 230. The articulated joints 230 allow the wing sections 220 to move, relative to the center section 218, through a range of motion along a vertical direction (i.e., orthogonal to a nominal flat surface representing the ground G). The range of motion defines the normal operating range of the wing section 220 during harvesting operations. However, the articulated joints 220 may be configured to allow the wing sections 220 to be folded into a stored position above the normal operating range.

Any type of articulated joints 230 may be used to provide relative movement between the wing sections 220 and the center section 218. For example, the articulated joints 230 may comprise pivot connectors (e.g., pins or hinges) defining respective pivot axes extending parallel to the forward direction F. A single pivot pin might be provided for each wing section 220 to provide simple rotation about the pin, or the multiple pivot pins may be provided along with an intervening linkage to provide more complex movement geometries (see, e.g., U.S. Pat. Pub. No. 2019/0000014). The articulated joints 230 also may allow pivoting movement relative to the center section 218 about multiple axes of rotation (see, e.g., U.S. Pat. Pub. No. 2018/0303029). The articulated joints 230 also may comprise linkages to allow relative translational movement without corresponding relative angular movement, or angular movement about a virtual pivot axis (see, e.g., U.S. Pat. Nos. 9,992,924 and 10,070, 575). The articulated joints 230 also may include respective wing section position control mechanisms, such as electric actuators (e.g., motors), hydraulic or pneumatic piston and cylinder actuators 232 (such as shown) or the like, to control the position of the wing section 220 relative to the center section 218. In the shown example, the positions of the wing sections 220 may be controlled by an actuator 232 joining the wing section to the center section 218 and/or by an actuator 234 controlling the position of one or more support wheels 236 that hold the wing sections 220 above the ground. Other alternatives and variations will be apparent to persons of ordinary skill in the art in view of the present disclosure.

Any variety of mechanisms may be used to provide relative movement between the various parts. For example, the actuators 212, 216 that control the position of the header 204 relative to the chassis 202, and the actuators that control the positions of the wing sections 220 relative to the center section 218, may comprise any suitable movable linkage mechanism. In FIG. 2, the actuators 212, 216 are shown as pressurized actuators, such as pneumatic or hydraulic piston and cylinder assemblies that are operated by valves and a source of pressurized fluid (gas, oil, etc.). In this case, the piston/cylinder assembly provides a movable linkage in the form of an adjustable-length telescoping connector. The various actuators alternatively may comprise electric motors, pressure-operated rotational drives, and so on as the power supply, and other kinds of movable linkage to provide the desired controlled movement. For example, an electric motor may be provided to drive a worm gear that engages a corresponding nut to provide an alternative telescoping linkage. One or more actuators may be bidirectional (e.g., able to forcibly move the header 204 or wing section 220 both up and down), or unidirectional (e.g., only able to lift the header 204 or wing section 220, while lowering is achieved by gravity). The actuators also may include any suitable drive mechanisms to convert a motive force to the desired type of motion, such as gears, drive shafts, worm screws, and so on. These and other such actuators and others are known in the art, and need not be described in more detail herein.

One preferred embodiment includes a center section 218 and two wing sections 220, but other embodiments may include only one wing section 220, or multiple center sections 218. Other variations are also possible.

Referring now more specifically to FIG. 3, a control system and associated components for an articulated header 204 are described in detail. In general terms, the exemplary control system includes a header control subsystem 300, left and right inboard ground height sensors $302_L$ and $302_R$, a plurality of left and right outboard ground height sensors $304_L$ and $304_R$, and a header position control system 306.

The ground height sensors 302, 304 are configured to generate a signal indicative of the height of a respective portion of the header 204 above the underlying ground G. The ground height sensors 302, 304 may comprise any suitable distance-measuring device that is operable in the context of a harvesting combine. For example, the ground height sensors 302, 304 may comprise ultrasonic, optical or radar rangefinders. The ground height sensors 302, 304 also may comprise mechanical rangefinders, such as a mechanical drag arm (i.e., feeler) or drag wheel that is connected to the header 204 by a linear or angular potentiometer to measure distance as a function of changing resistance of the potentiometer, such as known in the art. The use and operation of such height sensors is known in the art and need not be described in detail herein.

The ground height sensors 302, 304 are mounted to the header 204 at various locations along the transverse direction T of the header 204, and each is calibrated to provide a signal representing the distance between the ground G and the bottom of the header 204 at the transverse location at which each sensor is attached. In the shown example, the left and right inboard ground height sensors $302_L$ and $302_R$ are mounted on the center section 218, with each sensor being located between a lateral centerline 308 of the center section 218 and a respective lateral end of the center section 218. The left outboard ground height sensors $304_L$ are distributed in the lateral direction along the left wing section $220_L$, and the right outboard ground height sensors $304_R$ are distributed in the lateral direction along the right wing section 220R (the view in FIG. 3 is from the front of the vehicle 200, thus "right" and "left" are reversed in this view). In the shown embodiment, there are three left outboard ground height sensors $304_L$ and three right outboard ground height sensors $304_R$, but in other embodiments, there may be two or more of each sensor $304_L$, $304_R$.

The ground height sensors 302, 304, header control subsystem 300, and header position control system 306 are operatively connected such that the header position control system 306 can use signals from the ground height sensors 302, 304 as feedback to control one or more of the various actuators 212, 216, 232, 234 that define the positions of the center section 218 and wing sections 220 relative to the chassis 202 and the ground G. Any suitable wired or wireless communication system may be used to operatively connect the parts. For example, low-voltage wiring might be used to provide operative connections. The ground height sensors 302, 304 may periodically or continuously generate signals or the header control subsystem 300 or header position control system 306 may periodically query the sensors 302, 304 to transmit their respective signals. Such signals may be conditioned in any suitable way to provide a reliable and robust indication of the respective measurement. For example, analog-to-digital converters, bandpass filters, and the like may be integrated into the circuitry to clean up the signals.

The header position control system 306 generates output control signals to one or more of the actuators 212, 216, 232, 234 move the header 204 appropriately over uneven terrain. The header position control system 306 may comprise any suitable system. For example, the header position control system 306 may comprise a control system having a height position input variable corresponding to each individual height sensor 302, 304, so that the header position control system 306 directly monitors and reacts to each individual height signal across the width of the header 204. In such an embodiment, the header position control system 306 may send output control signals to all of the actuators to control the positions of the center section 218 and wing sections 220. For example, the header position control system 306 might send control signals to operate the mount actuators 212, 216 to keep the center section 218 at a desirable position relative to the ground G, and might send control signals to operate the wing section actuators 232, 236 to keep the wing sections 220 at desirable positions relative to the ground G.

In other embodiments, the header position control system 306 may comprise a unitary header position control system having only four header height input variables; namely: an inboard left height input ($L_I$), an outboard left height input ($L_O$), an inboard right height input ($R_I$), and an outboard right height input ($R_O$). Such unitary header position control systems 306 are in common use in agricultural combines, and are programmed to operate on certain basic assumptions. First, it is assumed that the four height input variables ($L_I$, $L_O$, $R_I$ and $R_O$) indicate the current height and tilt of the header 204 relative to the ground G at four respective fixed locations along the transverse direction T. Second, it is assumed that all of the sensors are located in approximately the same plane (i.e., the plane of the assumedly rigid or nearly rigid unitary header). Using these assumptions and the four height input variables ($L_I$, $L_O$, $R_I$ and $R_O$), the unitary header position control system 306 controls the mount actuator or actuators 212, 216 to raise and tilt the mount 108 (which typically is a feeder housing) to place the header 204 into a better or more uniform position over the ground. The ideal position typically is to have all four height sensors registering the same or a similar height above the ground, with the height value being appropriate for the crop conditions.

The specific control algorithms can vary, but a typical unitary header position control system 306 generates control outputs for the actuators 212, 216 by averaging the sensor signals on the two sides of the header 204. For example, the unitary header position control system 306 averages the values of the left-side inboard height sensor signal ($L_I$) and the left-side outboard height sensor signal ($L_O$) to determine a left-side average height, and averages the values of the right-side inboard height sensor signal ($R_I$) and the right-side outboard height sensor signal ($R_O$) to determine a right-side average height. Based on these two average height values, the system 306 issues control signals to raise, lower, or tilt the header 204. For example, if the left-side average height is above the desired cutting height, and the right-side average height is below the desired cutting height, the system 306 will generate commands to tilt the header 204 downward on the left side and upwards on the right side. Similarly, if the left-side and right-side average heights are all above the desired cutting height, the system 306 will generate commands to lower the entire header 204. Of course, combinations of commands can also be issued to account for provide combined tilting and height adjustments.

A unitary header position control system 306 typically is not suitable, on its own, to operate with an articulated header, such as the exemplary header 204 shown in FIGS. 2 and 3. An articulated header 204 does not satisfy the assumption that the four height sensors remain in approximately the same plane as one another, which makes the conventional four height input variables inadequate to assess the actual position of the center section 218 and wing sections 220. Furthermore, the output control signals from the unitary header position control system 306 only control the position of the center section 218 relative to the chassis 102 and the ground G, and are unable to control the positions of the wing sections 220.

This shortcoming of typical unitary header position control systems 306 may be addressed by providing an articulated header 204 having a header control subsystem 300 that controls moving the wing sections 220 to desirable positions relative to the ground G, and sends one or more emulated ground position signals to the unitary header position control system 306. In general terms, the header control subsystem 300 uses the sensor output of the left and right outboard ground height sensors $304_L$ and $304_R$ to perform two operations: operating the wing section actuator or actuators 232, 236 to level the wing sections 220 on the ground G, and sending a single emulated value of the outboard left height input variable ($L_O$) and a single emulated value of the outboard right height input variable ($R_O$) to the unitary header position control system 306. The output signals of the left and right inboard ground height sensors $302_L$, $302_R$ are sent directly or via the header control subsystem 300 to the unitary header position control system 306 as input for the inboard left height input variable ($L_I$) and inboard right height input variable ($R_I$), respectively.

Figure 4:
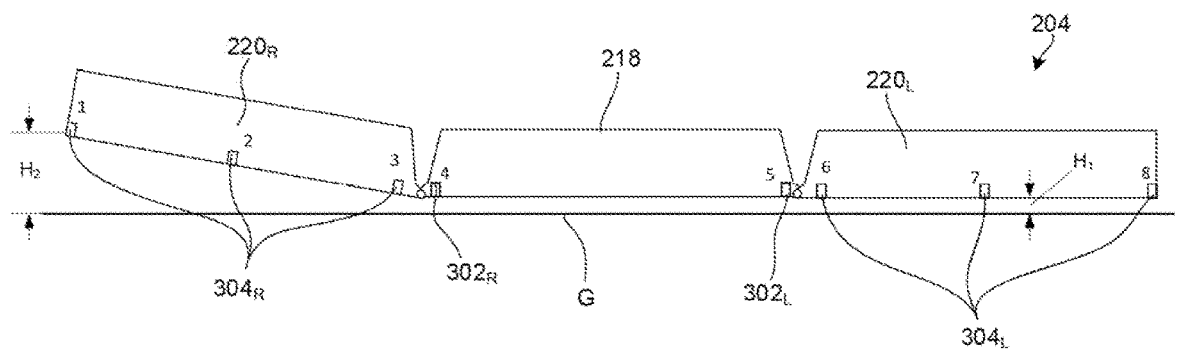
FIG. 4 is a schematic front view of an articulated header located on level ground.
Figure 5:
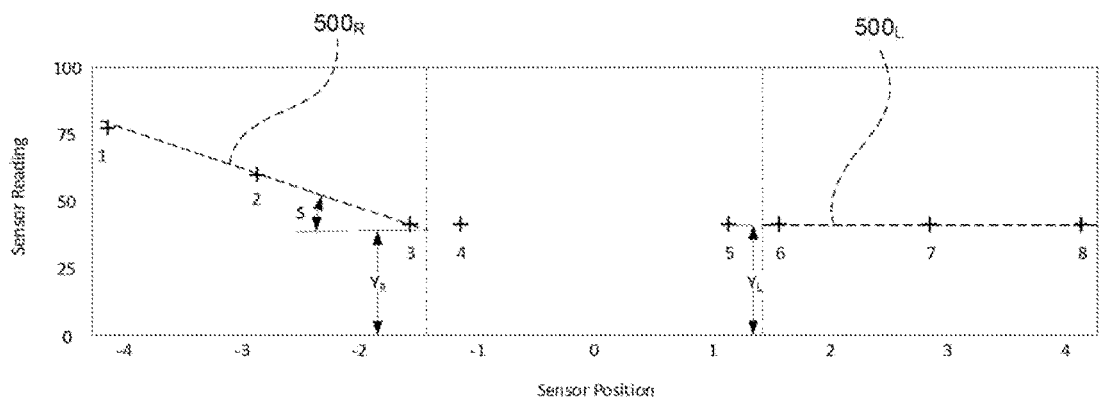
FIG. 5 is a plot of ground distance sensor output values for the header and ground configuration of FIG. 4.

The operation of leveling the wing section 220 is illustrated in FIGS. 4 and 5. FIG. 4 schematically illustrates a front view of the header 204 operating on level ground G, with the left wing section 220$_L$ and center section 220 being at a uniform first height H$_1$ above the ground, and the right wing section 220$_R$ being inclined with the inboard end at approximately the first height H$_1$ and the outboard end at a second height H$_2$ that is greater than the first height H$_1$. FIG. 5 illustrates the sensor output magnitude of the ground height sensors 302, 304 when the header 204 is in the position shown in FIG. 4, with sensor output magnitude on the y-axis as a function of percentage of maximum output, and relative physical position in the transverse direction T on the x-axis. For ease of reference, the individual height sensors 302, 304 are labeled as sensors numbered 1 through 8 to show the relative positions of the sensors on the header 204, and where their ground position sensor output is plotted in the graph in FIG. 5.

In this example, the first height H$_1$ is the desired elevation for processing the underlying crops. Thus, it is desirable to lower the right wing section 220 to the first height H$_1$. To do so, the header control subsystem 300 evaluates the output of the three right outboard ground height sensors 304$_R$ and generates a control signal to the wing section actuator (e.g., actuator 232) to lower the right wing section 220$_R$ until the signals from all three right outboard ground height sensors 304$_R$ register a similar output magnitude.

In a preferred embodiment, this control is accomplished by performing a linear regression using the spatial orientation and signal output readings from the right outboard height sensors 304$_R$, and determining the slope of the curve generated by the linear regression. A linear regression is a known mathematical function that assumes a linear correlation between a scalar response and one or more explanatory variables. The linear regression can be performed using a least squares approach, or any other known mathematical method, and such methods for performing the linear regression are known in the art or mathematics and need not be explained in detail here. Performing the linear regression on the position-dependent sensor output provides a fit line 500$_R$ having a slope value and a y-intercept value Y$_R$. The slope and y-intercept Y value define a linear function according to the formula $y = Sx + Y_R$ (where y is the y-axis value, S is the slope, x is the position on the x-axis, and Y$_R$ is the y-intercept value). The right wing section sensor data is modeled with the zero x-axis value at the physical location of the pivot connection between the center section 218 and the right wing section 220$_R$. Thus, the y-intercept value Y$_R$ represents a virtual sensor value at the pivot axis. The left wing section sensor data is modeled in a similar manner, with its own fit line 500$_L$ having its own slope and y-intercept value Y$_L$.

Upon performing the linear regression, the header control subsystem 300 determines that the slope of the right wing section fit line 500$_R$ does not equal zero (or is not within a range of zero magnitude). Thus, the header control subsystem 300 issues a control command to the wing section actuator 232 to move the wing section 220$_R$ to change the slope to equal zero or a value within a predetermined range of zero. In this case, the slope value is negative, and the header control subsystem 300 issues a command to lower the right wing section 220$_R$. In this case, this is accomplished by extending the actuator 232, but other embodiments may have different physical models and control functions for performing the leveling function. During this process, the header control subsystem 300 may monitor the output of the right outboard ground height sensors 304$_R$, and use these as feedback to ensure that the wing section 220$_R$ is properly lowered to the level position in which all of the sensors 304$_R$ are approximately the same distance from the ground. The details of such control loops are known in the art and need not be described herein. Such control may be continuous (i.e., at the fastest available processing and clock speed of the computer system), or periodic (i.e., at a predetermined rate that is less than the fastest speed).

Similarly, the header control subsystem 300 determines from the linear regression of the left outboard ground height sensors 304$_L$ that the slope of the left side fit line 500$_L$ is at or near zero. Thus, the header control subsystem 300 does not issue a command to change the position of the left wing section 220$_L$ relative to the center section 218.

Figure 6:
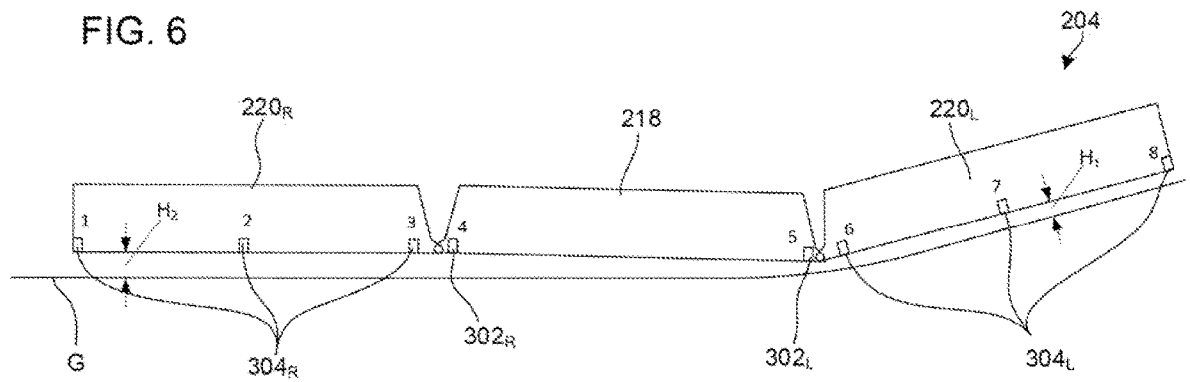
FIG. 6 is a schematic front view of an articulated header located on uneven ground.
Figure 7:
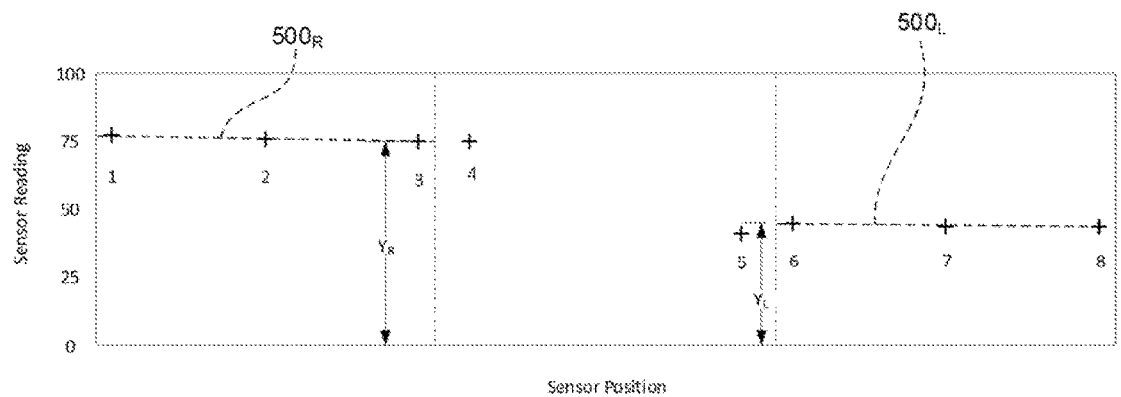
FIG. 7 is a plot of ground distance sensor output values for the header and ground configuration of FIG. 6.

The operation of the header control subsystem 300 to provide emulated values of the outboard left height input variable (L$_O$) and the outboard right height input variable (R$_O$) to the unitary header position control system 306 is illustrated in FIGS. 6 and 7. FIG. 6 schematically illustrates a front view of the header 204 operating on uneven ground G. As shown in FIG. 6, the left wing section 220$_L$ is located generally level over the ground G at a first height H$_1$, and the right wing section 220$_R$ is located generally level over the ground G at a second height H$_2$, with the first height H$_1$ being less than the second height H$_2$. This difference in heights is reflected in the magnitude of the ground height signals in FIG. 7. Similarly, FIG. 6 shows that the center section 220 is closer to the ground at the left side than at the right side, yielding a difference in height sensor output magnitude at the left and right inboard ground sensors 302$_L$ and 302$_R$ as shown in FIG. 7.

The header control subsystem 300 generates the emulated values of the outboard left height input variable (La) and the outboard right height input variable (R$_O$) by performing linear regressions on the left and right outboard height sensors 304$_L$ and 304$_R$. The y-intercept values Y$_L$ and Y$_R$ of the linear regressions are used as the left and right height input variables (L$_O$, R$_O$) respectively. These values are transmitted to the unitary header position control system 306, which operates to control the movable mount actuators (e.g., 212 and/or 216) to reposition the center section 218 of the header 204 as if it were a unitary header.

It will be understood that it is not strictly required to use a linear regression analysis in all embodiments. For example, in an alternative embodiment the a quadratic or higher-order regression could be used with a small quadratic component such that it yields output similar to a linear representation of a fit line but with a slight curvature. In such cases, the slope could be computed as the derivative of the slope at some point along the curve, or as an average value of the individual derivative values at multiple points on the curve, or by similar computations. The y-intercept be taken directly as the y-intercept of the quadratic fit line, or derived by extrapolating a line based on the derivative of the curve at a predetermined point on the curve or as an average of multiple derivatives at multiple points and using the y-intercept of that simulated line as the y-intercept value that is provided as the emulated outboard height input variable (L$_O$, R$_O$). Other alternatives and variations will be apparent to persons of ordinary skill in the art in view of the present disclosure.

As noted above, the unitary header position control system 306 can use any number of control algorithms to reposition the center section 218 of the header 204. In one example, the unitary header position control system 306 averages the values of the outboard and inboard right height inputs (R$_O$ and R$_I$) to generate an average right height (H$_R$), and averages the values of the outboard and inboard left height inputs (L$_O$ and L$_I$) to generate an average left height ($H_L$). Then, applying a predetermined motion model based on the physical parameters of the combine and header system, the unitary header position control system 306 sends control commands to one or more actuators 212, 216 to change the tilt angle or elevation of the header 206.

For instance, in the example of FIGS. 6 and 7, the left inboard ground height sensor 302$_L$ reads a value of 40 on the y-axis scale, and the right inboard ground height sensor 302$_R$ reads a value of 75 on the y-axis scale. These values are used by the unitary header position control system as the inboard left height input ($L_I$) and the inboard right height input ($R_I$), respectively. The emulated outboard left height input variable ($L_O$) has a value of about 45 on the y-axis scale, and the emulated outboard right height input variable ($R_O$) has a value of about 75 on the y-axis scale. Thus, the unitary header position control system 306 calculates the average left height $H_L$ as 42.5 (i.e., ($L_I$+$L_O$)/2=(40+45)/2) and the average right height $H_R$ as 75 (i.e., ($R_I$+$R_O$)/2=(75+75)/2). The unitary header position control system 306 compares these values to the desired operating height values, which depends on the crop conditions and type, and other known variables, and issues commands to the actuators 212, 216 to move the header 204 to achieve these values. In this case, the unitary header position control system 306 would send a command to rotate the header 204 to lower the right-hand side relative to the left-hand side to correct the offset, and this may be accompanied by an overall upwards or downwards movement to achieve the desired operating height.

It will be understood that the unitary header position control system 306 and header control subsystem 300 may operate independently. For example, while the unitary header position control system 306 is operating the actuators 212, 216 to rotate, raise or lower the center section 218, the header control subsystem 300 is operating to keep the wing sections 220 level on the ground G and to generate and send updated values for the emulated outboard left and right height input variables ($L_O$, $R_O$). Thus, the header control subsystem 300 and the unitary header position control system 306 are able to successfully position the center section 218 and wing sections 220 of the articulated header 204 on level or uneven terrain, without requiring any modification to the unitary header position control system 306. This is particularly advantageous for retrofitting articulated headers to agricultural vehicles previously equipped with unitary headers and their associated control systems.

Figure 8:
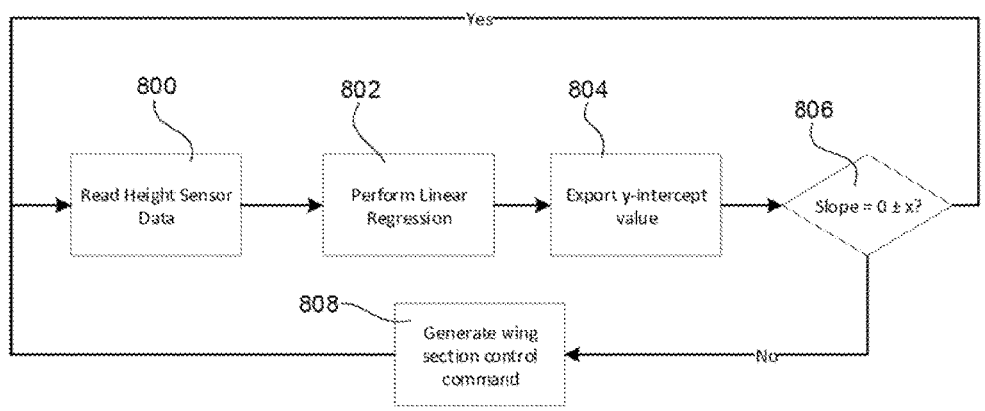
FIG. 8 illustrates an exemplary process flow for a header control subsystem.

FIG. 8 illustrates a control algorithm for operating the header control subsystem 300. In this example, a single articulated wing section is provided, but it will be understood that the control algorithm can be modified simply by adding additional steps mirroring the existing steps for any additional wing sections that might be included. The control algorithm begins at step 800, in which the header control subsystem 300 reads the height sensor data from the plurality (preferably three or more) wing section height sensors. In step 802, the header control subsystem 300 performs a linear regression on the height sensor data to calculate the slope and y-intercept of the data fit line. In step 804, the header control subsystem 300 sends the y-intercept value to a header position control system 306. In step 806, the header control subsystem 300 determines whether the slope of the fit line is equal to zero, or within a predetermined range (value "x") of zero (e.g., within 0.1 or within 0.2 of zero). If so, the process returns to step 800. If not, the process proceeds to step 808, where the header control subsystem 300 generates wing section control commands to move the wing section towards a level position (i.e., to reduce the slope of the fit line to equal or be near zero). The process then starts again at step 800.

It will be appreciated that the control algorithm could include any number of additional steps, such as time delays, noise filtering, averaging (e.g., performing the linear regression on time averaged values of the height sensor data to smooth the system reaction), and so on.

Figure 9:
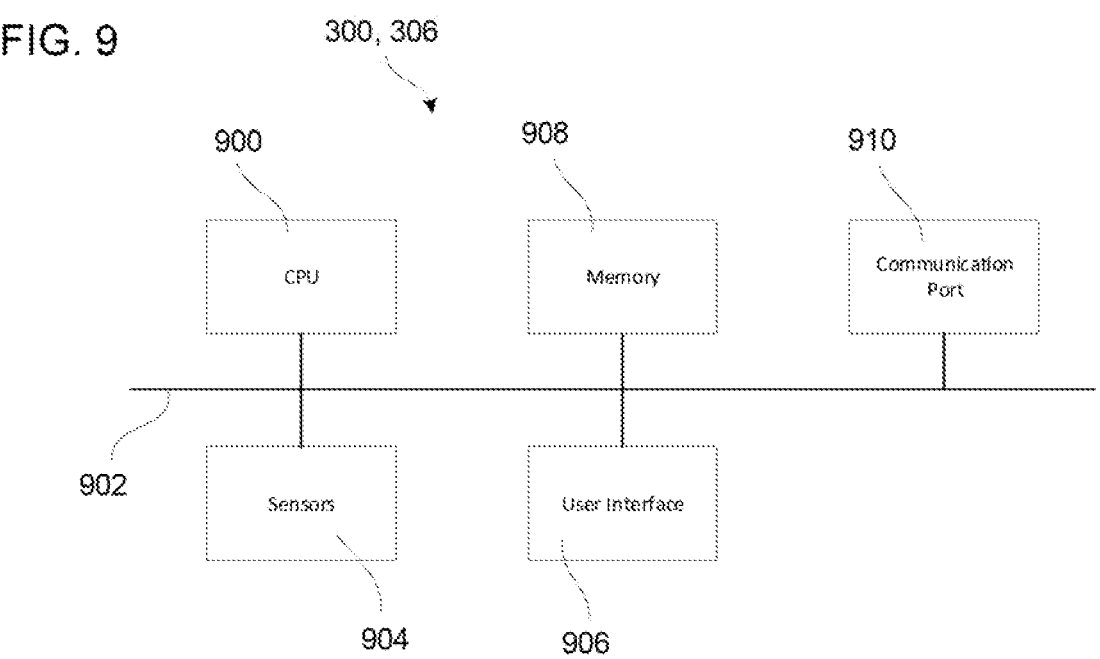
FIG. 9 is a schematic illustration of a control system.

The header control subsystem 300 and header position control system 306 may be implemented using any suitable arrangement of processors and logical circuits. FIG. 9 is a block diagram of exemplary hardware and computing equipment that may be used as either system 300, 306 as discussed herein. The system 300, 306 includes a central processing unit (CPU) 900, which is responsible for performing calculations and logic operations required to execute one or more computer programs or operations. The CPU 900 is connected via a data transmission bus 902 to sensors 904 (e.g., sensors 302 and 304), a user interface 906, and a memory 908. The user interface 906 may comprise any suitable connection port or the like for programming and customizing the operation of the system 300, 306. The system 300, 306 also may have a communication port 910 that is operatively connected (wired or wirelessly) to other combine control systems such as actuators 212, 216 for transmitting control signals, as discussed herein. One or more analog to digital conversion circuits may be provided to convert analog data from the sensors 904 to an appropriate digital signal for processing by the CPU 900, as known in the art.

The CPU 900, data transmission bus 902 and memory 908 may comprise any suitable computing device, such as an INTEL ATOM E3826 1.46 GHz Dual Core CPU or the like, being coupled to DDR3L 1066/1333 MHz SO-DIMM Socket SDRAM having a 4 GB memory capacity or other memory (e.g., compact disk, digital disk, solid state drive, flash memory, memory card, USB drive, optical disc storage, etc.). The selection of an appropriate processing system and memory is a matter of routine practice and need not be discussed in greater detail herein.

The above-described operating steps may be performed by the header control subsystem 300 and header position control system 306 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, the functionality performed by the systems 300, 306 may be implemented in software code or instructions which are tangibly stored on the tangible computer readable medium. Upon loading and executing such software code or instructions by the systems 300, 306, the systems 300, 306 may perform any of the functions or functional steps described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

In the foregoing embodiments, the header control subsystem 300 is described as being part of the articulated header 204. In such embodiments, the header control subsystem 300 may comprise a self-contained electronic unit that is mounted directly to the header 204. Alternatively, the header control subsystem 300 may be mounted elsewhere on the vehicle 200 and connected by wires or wirelessly to the outboard ground position sensors 304. It will also be understood that embodiments can be integrated into existing combine header control systems without any modification to the existing system. For example, a header assembly may be provided having the header control subsystem and related sensors pre-installed and ready to connect directly to a combine to replace a rigid header. However, it is also envisioned that the combine control system can be modified to incorporate the functionality of the header control subsystem via a software update or other modification.

Figure 10A:
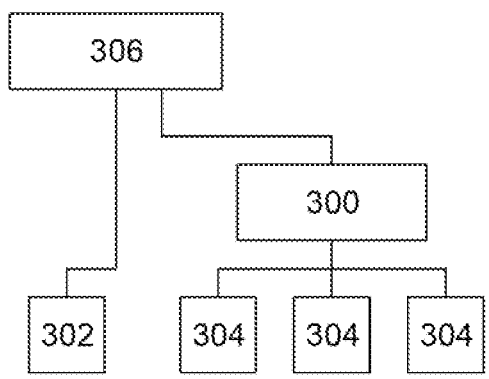
FIGS. 10A-10C schematically illustrate different control system and sensor configurations.
Figure 10B:
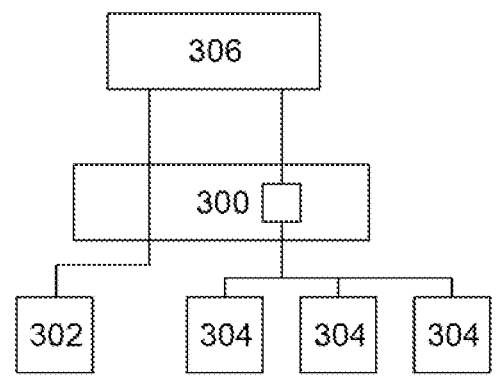
Figure 10C:
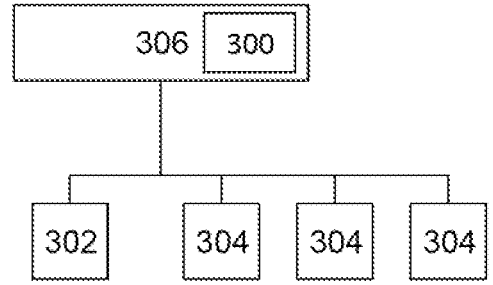

FIGS. 10A-10C illustrate various configurations for the header control subsystem 300 and header position control system 306, and their connections to the inboard sensors 302 and outboard sensors 304. As shown in FIG. 10A, the header control subsystem 300 is operatively connected to receive output from the plurality of outboard ground height sensors 304, but it is not strictly necessary for the header control subsystem 300 to be operatively connected to receive output from the inboard ground height sensors 302. For example, FIG. 10A illustrates the inboard ground height sensors 302 being connected directly to the header position control system 306 without being connected to the header control subsystem 300.

Alternatively, as shown in FIG. 10B, the inboard ground height sensors 302 may pass through the header control subsystem 300. This configuration may be useful to perform signal conditioning operations on all of the ground height sensor outputs. For example, it might be necessary to calibrate all of the ground height sensors 302, 304 in a similar manner to provide consistent outputs to the header position control system 306. This might be the case if the ground height sensors 302, 304 on the articulated header 204 have different output magnitudes than the ground height sensors on a unitary header that is being replaced, in which case the signals of the inboard sensors 302 must be scaled to provide output values within the range expected by the existing unitary header position control system 306.

FIG. 10C shows another alternative embodiment in which the header control subsystem 300 is integrated into the header position control system 300. In this configuration, the header position control system 306 is configured to receive input from all of the ground height sensors (i.e., it is not limited to the conventional four height sensor inputs of a unitary header position control system), and the header control subsystem 300 may comprise a software module that processes data from the outboard height sensors 304 to provide the emulated values as discussed above. Other alternatives and variations will be apparent to persons of ordinary skill in the art in view of the present disclosure.

Embodiments may be provided in various forms. In one instance, an embodiment may comprise an entire vehicle and header assembly, and the header control subsystem and header height control system may be integrated into the header or into the vehicle. In another instance, an embodiment may comprise a segmented header and an associated header control subsystem. In another instance, an embodiment may comprise a single header wing section and an associated header control subsystem. Embodiments also may be used in headers that do not have specific mechanical pivots or articulated joints, but nonetheless are expected to experience significant magnitudes of displacement along the width of the header. Other configurations may be used in other embodiments.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A header system for an agricultural vehicle, the header system comprising:
    a center section extending in a lateral direction from a first end to a second end with a lateral centerline of the center section between the first end and the second end;
    a first wing section movably attached to the first end of the center section and extending in the lateral direction from a first inboard end to a first outboard end, the first wing section being movable relative to the center section through a first range of motion;
    a first height sensor located on the first wing section between the first inboard end and the first outboard end, the first height sensor being configured to output a first height sensor signal;
    a second height sensor located on the header between the lateral centerline and the first height sensor, the second height sensor being configured to output a second height sensor signal;
    a header control subsystem operatively connected to the first and second height sensors, and configured to receive the first and second height sensor signals from the first and second height sensors, and generate a single emulated first height sensor signal based on the first and second height sensor signals; and
    a header position control system operatively connected to the second height sensor to receive the second height sensor signal, and operatively connected to the header control subsystem to receive the single emulated first height sensor signal, the header position control system being configured to operate one or more actuators to move the header in response to the second height sensor signal and the single emulated first height sensor signal.

2. The header system of claim 1, wherein the header control subsystem is configured to generate the single emulated first height sensor signal by calculating a regression of the first and second height sensor signals.

3. The header system of claim 2, wherein the regression is a linear regression.

4. The header system of claim 1, wherein the header control subsystem is configured to generate the single emulated first height sensor signal by calculating a linear regression of the first and second height sensor signals, calculating a y-intercept value of the linear regression, and setting the y-intercept value as the single emulated first height sensor signal.

5. The header system of claim 1, further comprising two additional first height sensors laterally spaced between the first inboard end and the first outboard end.

6. The header system of claim 5, wherein the header control subsystem is configured to generate the single emulated first height sensor signal by calculating a linear regression of three first height sensor signals, calculating a y-intercept value of the linear regression, and setting the y-intercept value as the single emulated first height sensor signal.

7. The header system of claim 1, further comprising:
a second wing section movably attached to the second end of the center section and extending in the lateral direction from a second inboard end to a second outboard end, the second wing section being movable relative to the center section through a second range of motion;
a third height sensor located on the second wing section between the second inboard end and the second outboard end, the third height sensor being configured to output a respective third height sensor signal; and
a fourth height sensor located on the header between the lateral centerline and the third height sensor and configured to output a fourth height sensor signal;
wherein the header control subsystem is operatively connected to the third and fourth height sensors, and configured to receive the third and fourth height sensor signals from the third and fourth height sensor, and generate a single emulated second height sensor signal based on the third and fourth height sensor signals.

8. The header system of claim 7, further comprising at least three third height sensors laterally spaced between the second inboard end and the second outboard end.

9. The header system of claim 8, wherein the header control subsystem is configured to generate the single emulated second height sensor signal by calculating a linear regression of three third height sensor signals, calculating a y-intercept value of the linear regression, and setting the y-intercept value as the single emulated second height sensor signal.

10. The header system of claim 7, wherein the header position control system is configured to operate based on only four header height input variables, and is configured to receive the second height sensor signal, the fourth height sensor signal, the single emulated first height sensor signal, and the single emulated second height sensor signal as the only four header height input variables.

11. The header system of claim 1, wherein the second height sensor is located on the first wing section.

12. The header system of claim 11, further comprising a third height sensor located on the center section, the third height sensor being configured to output a third height sensor signal.

13. The header system of claim 1, wherein the second height sensor is located on the center section.

14. An agricultural combine comprising:
a chassis;
a header comprising:
a center section extending in a lateral direction from a first end to a second end with a lateral centerline of the center section between the first end and the second end,
a first wing section movably attached to the first end of the center section and extending in the lateral direction from a first inboard end to a first outboard end, the first wing section being movable relative to the center section through a first range of motion,
a first height sensor located on the first wing section between the first inboard end and the first outboard end, the first height sensor being configured to output a first height sensor signal,
a second wing section movably attached to the second end of the center section and extending in the lateral direction from a second inboard end to a second outboard end, the second wing section being movable relative to the center section through a second range of motion,
a second height sensor located on the second wing section between the second inboard end and the second outboard end, the second height sensor being configured to output a second height sensor signal,
a third height sensor located on the header between the lateral centerline and the first height sensor and configured to output a third height sensor signal, and
a fourth height sensor located on the header between the lateral centerline and the second height sensor and configured to output a fourth height sensor signal;
a movable mount connecting the header to the chassis;
a header control subsystem operatively connected to the first, second, third and fourth height sensors, the header control subsystem being configured to:
receive the first and third height sensor signals from the first and third height sensors and generate a single emulated first height sensor signal based on the first and third height sensor signals, and
receive the second and fourth height sensor signals from the second and fourth height sensors and generate a single emulated second height sensor signal based on the second and fourth height sensor signals; and
a header position control system operatively connected to the third height sensor, the fourth height sensor, the header control subsystem, and the movable mount, the header position control system being configured to operate the movable mount to change an orientation of the header relative to the chassis based on the single emulated first height sensor signal, and the single emulated second height sensor signal,
the header position control system further being operatively connected to the third height sensor to receive the third height sensor signal, and operatively connected to the header control subsystem to receive the single emulated first height sensor signal, the header position control system being configured to operate one or more actuators to move the header in response to the third height sensor signal and the single emulated first height sensor signal.

15. The agricultural combine of claim 14, wherein the header control subsystem is configured to (i) generate the single emulated first height sensor signal by calculating a regression of the first and third height sensor signals, and (ii) generate the single emulated second height sensor signal by calculating a regression of the second and fourth height sensor signals.

16. The agricultural combine of claim 15, wherein each regression is a linear regression.

17. The agricultural combine of claim 14, wherein:
the header control subsystem is configured to generate the single emulated first height sensor signal by calculating a linear regression of the first and third height sensor signals, calculating a y-intercept value of the linear regression, and setting the y-intercept value as the single emulated first height sensor signal, and
the header control subsystem is further configured to generate the single emulated second height sensor signal by calculating a linear regression of the second and fourth height sensor signals, calculating a y-intercept value of the linear regression, and setting the y-intercept value as the single emulated second height sensor signal.

18. The agricultural combine of claim 14, wherein the third height sensor is located on the first wing section.

19. The agricultural combine of claim 18, further comprising a fifth height sensor located on the center section, the fifth height sensor being configured to output a fifth height sensor signal.

20. The agricultural combine of claim 14, wherein the third height sensor is located on the center section.

21. A method for operating an articulated header comprising a center section operatively connected to a chassis by a movable mount, and two wing sections movably connected to the center section, the center section defining a lateral centerline, the method comprising:
(a) receiving a plurality of first height sensor signals from respective first height sensors that are positioned on the header and on one side of the lateral centerline;
(b) generating a single emulated first height sensor signal based on the plurality of first height sensor signals;
(c) receiving a plurality of second height sensor signals from respective second height sensors that are positioned on the header and on the other side of the lateral centerline;
(d) generating a single emulated second height sensor signal based on the plurality of second height sensor signals;
(e) providing the single emulated first height sensor signal and the single emulated second height sensor signal as two individual inputs to a header position control system; and
(f) operating the header position control system to move the center section relative to the chassis based on the two individual inputs;
(g) providing one of the plurality of first height sensor signals to the header position control system; and
(h) operating one or more actuators, via the header position control system, to move the header in response to said one of the plurality of first height sensor signals and the single emulated first height sensor signal.

22. The method of claim 21,
wherein step (b) comprises generating the single emulated first height sensor signal by calculating a regression of the first height sensor signals, and
wherein step (d) comprises generating the single emulated second height sensor signal by calculating a regression of the second height sensor signals.

23. The method of claim 22, wherein each regression is a linear regression.

24. The method of claim 21,
wherein step (b) comprises generating the single emulated first height sensor signal comprises calculating a first linear regression of the first height sensor signals, calculating a first y-intercept value of the first linear regression, and setting the first y-intercept value as the single emulated first height sensor signal; and
wherein step (d) comprises generating the single emulated second height sensor signal comprises calculating a second linear regression of the second height sensor signals, calculating a second y-intercept value of the second linear regression, and setting the second y-intercept value as the single emulated second height sensor signal.

25. The method of claim 21, wherein the header position control system has only two header height input variables.

26. The method of claim 21, wherein two of the first height sensors are located on one of the two wing sections.

27. The method of claim 26, further comprising a third height sensor located on the center section, the third height sensor being configured to output a third height sensor signal.

28. The method of claim 21, wherein one of the first height sensors is located on the center section.

* * * * *